Patented Feb. 24, 1953

2,629,750

UNITED STATES PATENT OFFICE 2,629,750

STABILIZED AZULENE OIL

Stephen Rath, New York, N. Y., assignor to Science Associates Inc., New York, N. Y., a corporation of New York No Drawing. Application September 25, 1948, Serial No. 51,300

1 Claim. (Cl. 260—666)

This invention relates to a process for preparing a stabilized product from azulene-containing oils recovered from Achillea millefolium, which contain azulene compounds, particularly the blue azulene hydrocarbon of the formula $C_{15}H_{18}$.

The main object of this invention consists in providing a stable azulene-containing oil which can be stored for a relatively long time without substantial change of the chemical and physical properties.

Another object of the invention consists in providing a preparation which is substantially free from unstable components.

Other objects and the advantages of the invention will be apparent from the following specification and claim which disclose some preferred embodiments of my invention.

It has been known that azulene-containing oils may be obtained, for example by extraction with solvents or steam distillation, from various plants. However, the stability of these oils is not satisfactory, because they show unexpected changes by the separation of certain ingredients or by atmospheric influences.

I have now found that stable products of valuable, uniform, properties may be obtained from the plant Achillea millefolium by recovering the azulene-containing oils from this plant and treating the oil in the manner described hereinafter.

Example.—Flowers of Achillea millefolium are placed in a suitable container and extracted therein first with boiling ethyl-alcohol and subsequently with acetone. The extraction is carried out in the customary manner. The solution thus obtained by extraction is subjected to cooling to temperatures below 0° C., such as minus 10° to minus 15° C. for two to five days. After this time, the clear solution is separated from the solid ingredients formed upon cooling, and the solvent is removed by distillation. The oil obtained as the residue of this distillation is subjected to fractional distillation under high vacuum, such as 1 to 3 millimeter preferably after the addition of a small amount of e. g. 0.5–2.5% of a highly adsorptive, chemically indifferent substance, such as silica gel or alumina. The lower-boiling azulene-free oils, which distill over first, and the blue azulene-containing fraction are collected separately and distillation is stopped when the distillate becomes subtially free from azulene, which is indicated by the absence of the blue color. For example, the fraction boiling between 135° and 165° C. may be collected separately from the lower and higher boiling fractions. The fractional distillation of the product thus obtained may be repeated.

Instead of extracting the Achillea millefolium flowers, steam distillation may also be used. In this case the flowers are covered with distilled water and then subjected to distillation with steam in the customary manner. The distillate is separated into an oily product and an aqueous liquid consisting mainly of condensed steam. The oily product is dissolved in alcohol or acetone and the solution is treated in the manner described above, i. e. by cooling the solution to a temperature below 0° C., separating the clear solution from the ingredients solidified upon cooling, removing the solvent by evaporation or distillation and subjecting the oily residue to fractional distillation under the above described conditions.

In carrying out the present invention, it is essential to observe all the above described conditions, i. e. the use of Achillea millefolium as raw material, treatment of the azulene-containing oil in dissolved form by cooling to the above mentioned temperatures, and fractional distillation of the oil under the before-mentioned conditions. The combined use of these conditions is indispensable in obtaining the desired product.

The azulene-containing oils obtained according to my invention contain for example 25% and more of azulene. They are distinguished by high stability and uniformity. The stability of these oils may be increased by the addition of a trace of ascorbic acid or pure hydroquinone.

It will be understood that my invention is not limited to the specific substances and steps described above and may be carried out with various modifications without departing from the scope of the invention as defined in the appended claim.

What I claim is:

A process for preparing a stabilized product from azulene-containing oils recovered from Achillea millefolium, comprising in combination the subsequent steps of dissolving said oils in a volatile solvent, cooling the solution thus formed to a temperature below 0° C., separating the solidified portions from the solution, evaporating the solvent, and subjecting the oil residue to fractional distillation at 135° to 165° C. under a vacuum of 1–3 mm.

STEPHEN RATH.

(References on following page)

REFERENCES CITED

The following references are of record in the file of this patent:

UNITED STATES PATENTS

| Number | Name | Date |
|---|---|---|
| 400,967 | Sutherland | Apr. 9, 1889 |
| 434,727 | Schmidt | Aug. 19, 1890 |
| 2,369,465 | Keil | Feb. 13, 1945 |
| 2,432,217 | Thompson | Dec. 9, 1947 |

FOREIGN PATENTS

| Number | Country | Date |
|---|---|---|
| 14,816 | Great Britain | of 1897 |
| 546,750 | Germany | Mar. 16, 1932 |

OTHER REFERENCES

Clark, Am. Perfumer and Essential Oil Review, January 1948, pages 38 and 39.

Weidman, J. A. M. A., volume 128, Number 11, pages 805 to 811, July 14, 1945.

Lyman, American Pharmacy, J. P. Lippincott Company, Philadelphia, 1945, pages 70, 72, 73.

Heubner et al., Arch. Exptl. Path. Pharmakol., volume 171, pages 329 to 334 (1933).

Pommer, Archiv. für Experiment. Pathol. und Pharmakol., 1942, pages 74 to 82.

Osol, The Dispensatory of the United States of America, 24th Edition. J. P. Lippincott, Philadelphia, 1947, pages 765 to 766.

Harry, Modern Cosmeticology. Chemical Publishing Company, Inc., Brooklyn, New York, 1947. Pages 185 to 190.

Koch, Pharmaceutical Abstracts, volume VIII (1942). Pages 103 to 104.